Figure 1:
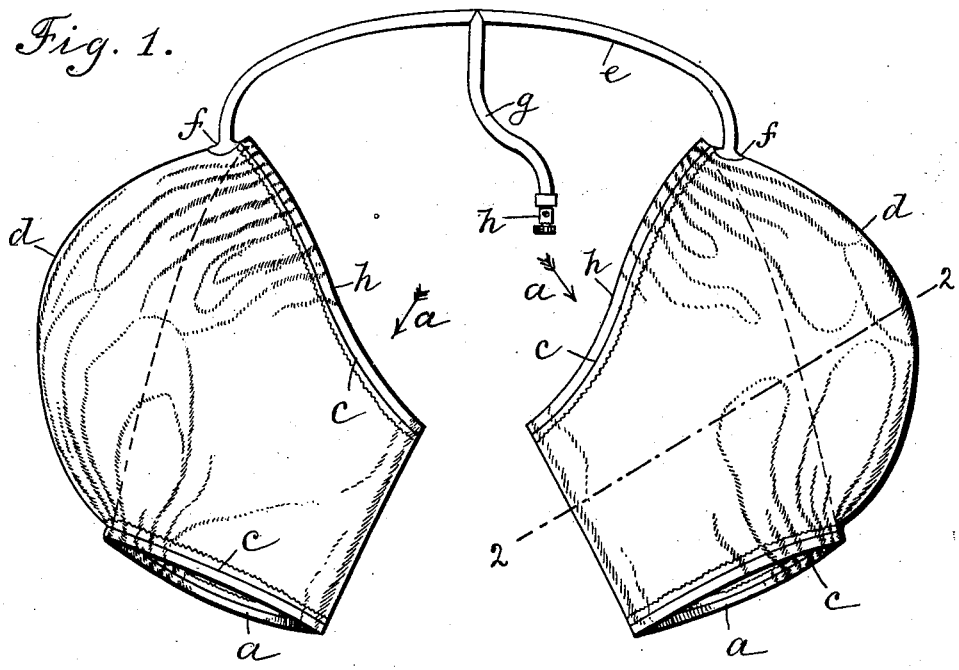

No. 685,158. Patented Oct. 22, 1901.
I. W. MACCOLINI.
LIFE PRESERVER.
(Application filed Feb. 11, 1901.)
(No Model.)

UNITED STATES PATENT OFFICE.

ICILIUS WILLIAM MACCOLINI, OF INWOOD, NEW YORK.

LIFE-PRESERVER.

SPECIFICATION forming part of Letters Patent No. 685,158, dated October 22, 1901.

Application filed February 11, 1901. Serial No. 46,818. (No model.)

*To all whom it may concern:*

Be it known that I, ICILIUS WILLIAM MACCOLINI, a citizen of the United States, residing at Inwood, in the county of Nassau and State of New York, have invented certain new and useful Improvements in Life-Preservers, of which the following is a full and complete specification, such as will enable those skilled in the art to which it appertains to make and use the same.

This invention relates to life-preservers; and the object thereof is to provide an improved device of the class described which is simple in construction and operation and which may be quickly, conveniently, and easily applied whenever desired; and with this and other objects in view the invention consists in a life-preserver constructed as hereinafter described and claimed.

The invention is fully disclosed in the following specification, of which the accompanying drawings form a part, in which the separate parts of my improvement are designated by the same reference characters in each of the views, and in which—

Figure 2:
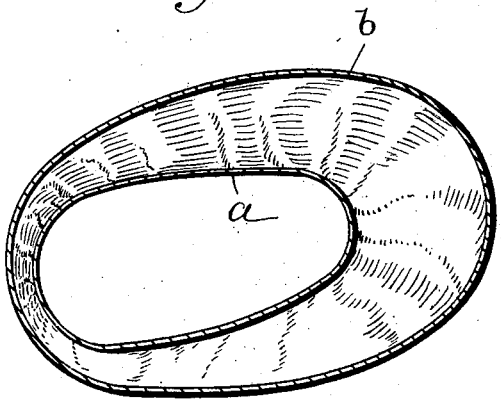

Figure 1 is a plan view of a life-preserver made according to my invention; Fig. 2, a transverse section on the line 2 2 of Fig. 1.

In the practice of my invention I provide two sleeves $a$, composed of rubber and canvas or any suitable material, and these sleeves are inclosed in a casing $b$, of similar material, secured thereto at the ends thereof by stitching at $c$ or in any desired manner. The sleeves $a$ and the casings $b$ are flexible, and the casings $b$ are preferably much larger than said sleeves, especially at one side thereof, as shown at $d$, where they are enlarged to increase the interior capacity thereof. A flexible tube $e$ is secured to the casings $b$ at $f$ and communicates with the interior thereof, and said tube is provided centrally with a branch tube $g$, having a mouthpiece $h$, which contains a valve and by means of which the casings $b$ may be inflated, and the tube $e$ and the branch tube $g$ are composed of rubber or similar material.

The sleeves $a$ are longer at the front than at the back thereof, as are also the casings $b$, and said sleeves are preferably cut away at the neck end diagonally, as shown at $h$, and in practice the arms are inserted through said sleeves in the direction of the arms $a$, and the tube $e$ extends transversely across the breast, so that the branch tube $g$ will be in reach at all times.

The tube $e$ serves to hold the sleeves $a$ and the casings $b$, connected therewith, close to the shoulders, so as to partially overlap the shoulders, and when the said casings $b$ are fully inflated the device will serve to support a body in the water, as will be readily understood.

This invention is simple in construction and operation and comparatively inexpensive and is perfectly adapted to accomplish the result for which it is intended, and said device may be packed in a small parcel and conveniently carried or shipped wherever desired.

Having fully described my invention, what I claim as new, and desire to secure by Letters Patent, is—

A life-preserver, comprising hollow sleeve-shaped portions composed of flexible material and adapted to fit around the upper arm, and through which the arms are adapted to be inserted, said parts being connected by a flexible tube adapted to pass across the back or breast and which is provided with a nozzle or mouthpiece connection, substantially as shown and described.

In testimony that I claim the foregoing as my invention I have signed my name, in presence of the subscribing witnesses, this 7th day of February, 1901.

ICILIUS WILLIAM MACCOLINI.

Witnesses:
   LOUIS A. GUIDICE,
   F. A. STEWART.